United States Patent [19]

Eales

[11] Patent Number: 5,277,726
[45] Date of Patent: Jan. 11, 1994

[54] CABLE REPAIR

[75] Inventor: Brian A. Eales, Stansted, United Kingdom

[73] Assignee: Northern Telecom Limited, Montreal, Canada

[21] Appl. No.: 916,029

[22] Filed: Jul. 17, 1992

[30] Foreign Application Priority Data

Jul. 18, 1991 [GB] United Kingdom ............... 9115471

[51] Int. Cl.$^5$ .............................................. B32B 35/00
[52] U.S. Cl. ...................................... 156/94; 156/49; 156/86; 29/402.09; 29/868; 174/88 R
[58] Field of Search ............... 156/94, 98, 49–56; 29/402.09, 868, 869; 174/84 R, 88 R, 88 C, 89, 91, 92; 264/36, 342 R; 156/158; 156/85; 86, 187, 192, 304.1; 174/DIG 8;

[56] References Cited

U.S. PATENT DOCUMENTS

| | | | |
|---|---|---|---|
| 2,640,095 | 5/1953 | Lewis et al. | 174/88 C |
| 2,768,105 | 10/1956 | Dittmore et al. | 156/49 |
| 3,141,060 | 7/1964 | Norton | 174/88 R |
| 3,441,659 | 4/1962 | Laudig et al. | 174/88 C |
| 3,787,607 | 1/1974 | Schlafly | 156/49 |
| 4,192,964 | 3/1980 | Sacks | 174/88 R |
| 4,512,833 | 4/1985 | Kridl et al. | 29/402.09 |
| 4,965,411 | 10/1990 | Bruneval | 156/49 |

FOREIGN PATENT DOCUMENTS 53-29680  3/1978  Japan ................... 174/88 C

Primary Examiner—Michael W. Ball
Assistant Examiner—Robert W. Robey
Attorney, Agent, or Firm—Lee, Mann, Smith, McWilliams, Sweeney & Ohlson

[57] ABSTRACT

In respect of a cable having a plastics electrically insulating layer (16) covered by a metal tape layer (17) which is encased by a plastics jacket layer (19), a method of reinstatement of the metal tape and plastics jacket layers on an exposed region of the electrically insulating layer (16). Two plastics tubes (30) with associated metal collars (34) are introduced around the exposed region and an end of each is inserted under the end of the metal tape (17) at each end, the tape having previously been flared out to accommodate the tube end. The flared tape ends are welded to the collars (34), and more tape (40) is formed around the exposed region and also welded to the collars (34) to complete reinstatement of the metal layer. The plastics jacket reinstatement is effected using a length of heat-shrunk tubing (50, 53) with a lining (54) of melt-flowable plastics material.

17 Claims, 4 Drawing Sheets

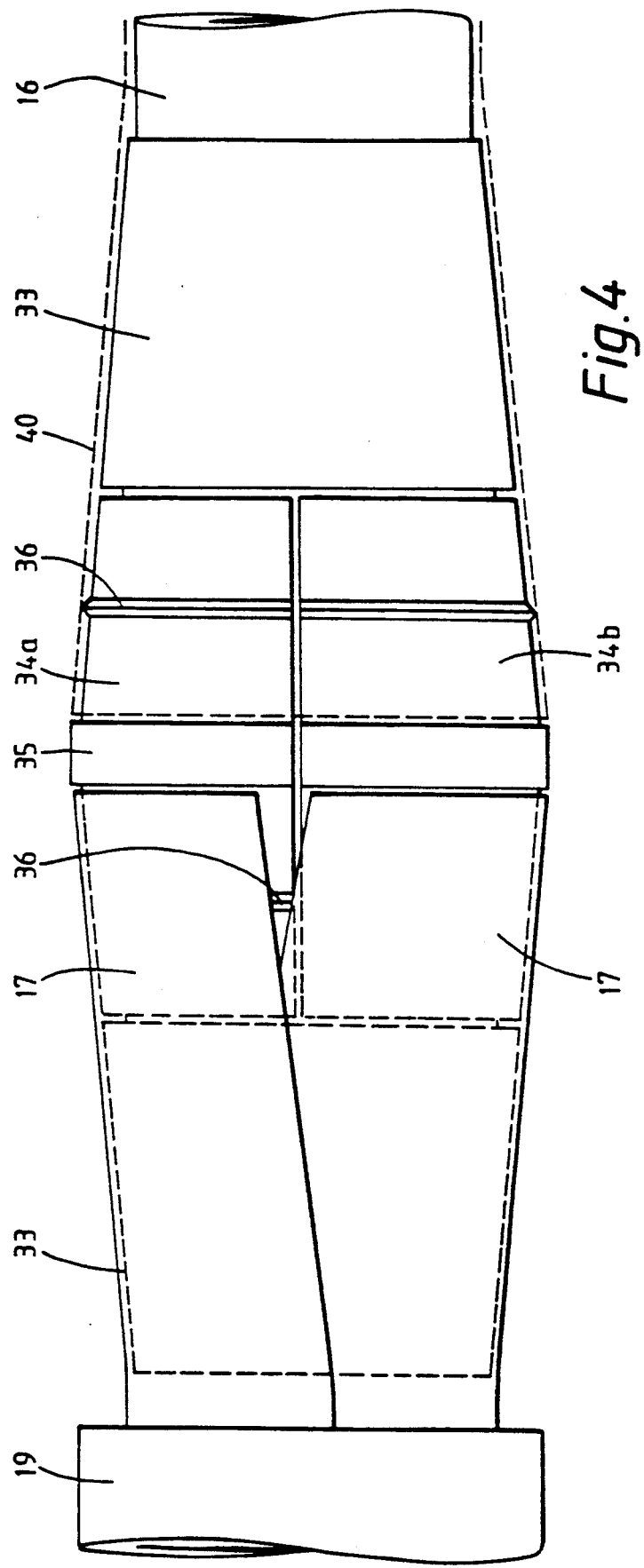

CABLE REPAIR

BACKGROUND TO THE INVENTION

This invention relates to the repair of cables with an electrically insulating dielectric layer whose integrity needs to be maintained. Such a dielectric layer typically surrounds a high voltage electrical conductor, which itself may surround a packaged optical fibre. Located between the packaged fibre and the high voltage conductor, there may be a strength member constituted for instance by one or more layers of stranded steel. Particularly the invention relates to the repair of such cables in which the dielectric layer is covered by a metal tape layer, a function of which is to provide a measure of protection against localised damage of the surface of the dielectric layer which could otherwise give rise to impaired dielectric strength, for instance as the result of the initiation of a crack in the dielectric. In its turn the metal tape layer is protected by a plastics jacket layer. For some applications such cables are required in long lengths, for instance in lengths of 25 Km. During the manufacture of such lengths, imperfections in the metal tape layer or in its covering plastics jacket layer can occur which leave the underlying dielectric layer intact. In these circumstances, rather than to strip the jacket and tape layers from the whole length of cable before recommencing a complete replacement of these two layers, or scrap the entire cable, it would be preferred to effect a localised repair in which only the defective portion or portions of these layers are removed and then replaced with reinstatement material.

SUMMARY OF THE INVENTION

Generally it will be a requirement that such reinstatement does not provide cable in the reinstatement region with a drastically enlarged outer diameter compared with that pertaining elsewhere along the length of the cable. Additionally it should not provide the reinstatement region with a markedly increased stiffness. Also it should be capable of being reverse flexed without damaging either the integrity of the reinstatement metal layer or the underlying dielectric layer. It has been found that a reinstatement procedure which satisfies the flexibility requirements, but which is liable to give rise to the presence of voids in the structure, is likely to result in a structure in which reverse flexing tends to produce unacceptable wrinkles and cracking in the reinstatement part of the metal layer. The present invention is concerned with a reinstatement procedure in which the incidence of such voids is low, in which the flexibility of the reinstatement region approaches that of the other regions of the cable, and in which the outer diameter of the reinstatement region is not unduly larger than that of other regions of the cable.

According to the present invention there is provided a method of cable reinstatement including the provision of a reinstatement metal layer to join two longitudinally spaced regions of the cable where the cable has a plastics electrically insulating layer covered by a metal tape layer, said spaced regions being separated by an intervening region from which the metal tape layer has previously been removed, in which method the metal tape layer in said spaced regions is flared, two tubes are assembled around the electrically insulating layer in the intervening region, one end of each tube is introduced under an associated one of the flared regions of metal tape and is welded to it, and a reinstatement length of metal tape is engaged around the electrically insulating layer in the intervening region and its ends welded to the two tubes.

The invention also provides, in respect of a cable having a plastics electrically insulating layer covered by a metal tape layer which is encased by a plastics jacket layer, which cable has an exposed intact region of its electrically insulating layer extending between two positions where an original portion of the metal tape layer protrudes a distance from an original portion of the plastics jacket layer, a method of providing a reinstatement metal layer to surround the exposed intact region of the electrically insulating layer and to extend between said protruding original portions of the metal tape layer, in which method each of said protruding portions of the metal tape layer is flared to permit the insertion, between its inner surface and the outer surface of the underlying region of the electrically insulating layer, of the end of an associated one of two plastics tubes previously introduced around the exposed intact region of the electrically insulating layer, each of which tubes has a substantially cylindrical bore and is provided with a metal collar between tapered ends, wherein, subsequent to said insertion, the flared protruding portions of the metal tape layer are welded to the metal collars of their associated plastics cylinders, and a length of metal tape previously formed around the region between the collars of the two plastics cylinders is also welded to the collars.

Subsequent to the provision of the metal reinstatement layer, this layer is itself covered with a reinstatement plastics jacket. Such a jacket can for instance be provided by cross-head extrusion using split extrusion tooling. Recourse to the use of such tooling can however be avoided, for instance by the use of heat-shrunk tubing internally lined with a layer of melt-flowable plastics material. A length of such tubing may be introduced over one end of the cable, located with ends covering the ends of original portions of the plastics jacket layer, and then heated to produce a flow of its lining material while the tubing is shrunk on to the cable.

BRIEF DESCRIPTION OF THE DRAWINGS

These follows a description of providing a cable with a reinstatement metal layer and a reinstatement jacket in a manner embodying the invention in a preferred form. The description refers to the accompanying drawings in which:

FIG. 4 depicts an assembly of FIG. 3 in position on the cable.

DETAILED DESCRIPTION OF THE PREFERRED EMBODIMENT

Figure 1:
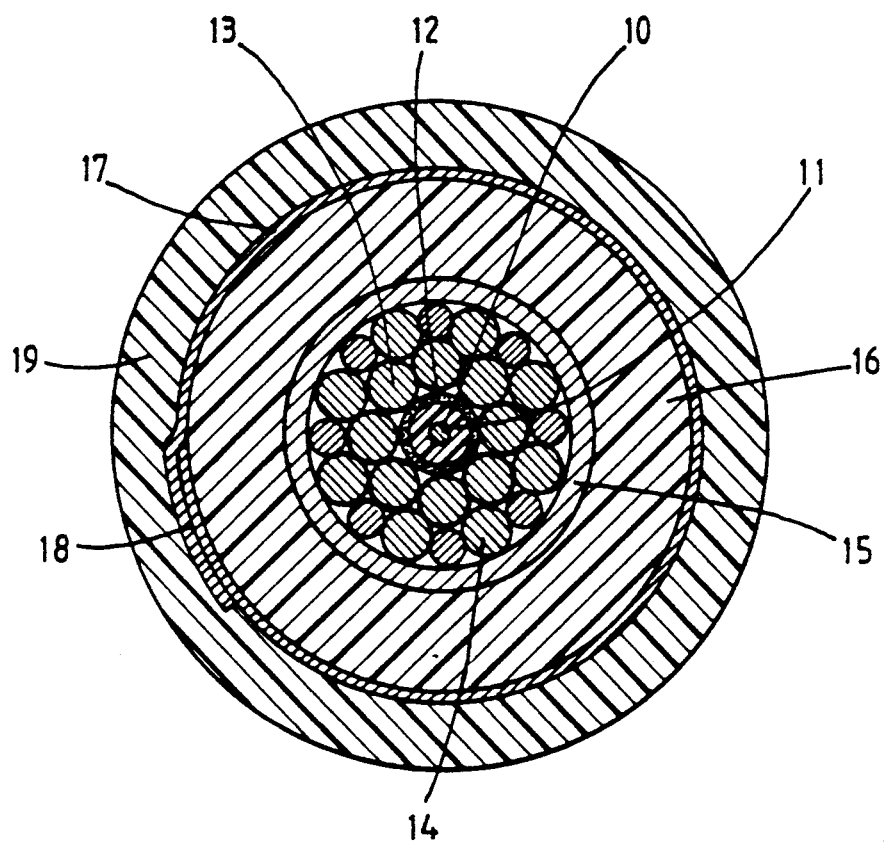
FIG. 1 depicts a schematic cross-section of the cable, a portion of whose metal tape and plastics jacket layers are to be reinstated.

The cable whose cross section is depicted in FIG. 1 has at its core a single optical fibre 10 packaged in plastics buffer coatings 11 and 12. Surrounding the packaged fibre are two layers 13 and 14 of steel stranded strength members. the resulting assembly is encased in a welded swaged copper tube 15 which is adapted to function as a high voltage conductor insulated by an electrically insulating dielectric layer 16 of natural (unfilled) medium density polyethylene approximately 2 mm thick. Wrapped around the dielectric layer 16 is a metal tape 17. This tape is an electrolytic chrome-plated steel tape 0.175 mm thick faced on both sides with 0.05mm thick ethylene acrylic acid copolymer both sides with an 0.05 mm thick ethylene acrylic acid copolymer adhesive layer (not shown). One function of the adhesive layer is to secure together the two edges of the metal tape 17 in the region 18 of their overlap. The cable is completed by the provision of an extruded jacket 19 of carbon-loaded high density polyethylene having an outer diameter of approximately 13.4 mm.

Figure 2:
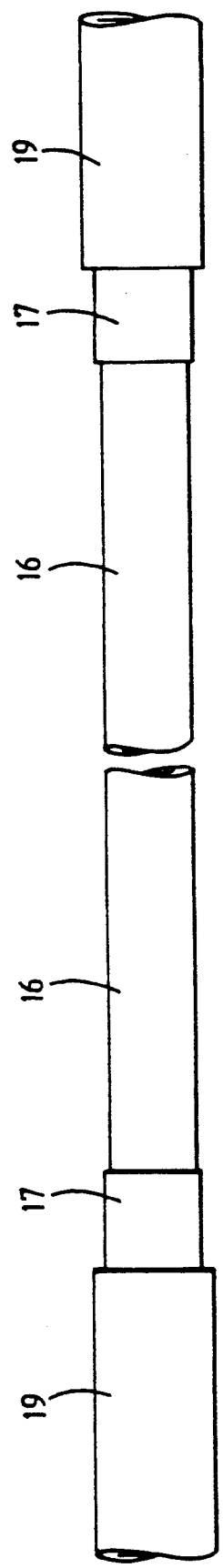
FIG. 2 depicts a side view of a length of the cable of FIG. 1 where reinstatement is to be made.

FIG. 2 depicts a length of cable of the construction just described with reference to FIG. 1. Over a portion of the length of this cable, the jacket layer 19 and the underlying metal tape 17 have been removed leaving the insulating layer intact to expose a region of intact undamaged dielectric layer 16. At each end of the exposed dielectric layer 16, which may typically be between 20 and 100 cm in length, the metal tape 17 protrudes a short distance beyond the end of the jacket 19.

Figure 3:
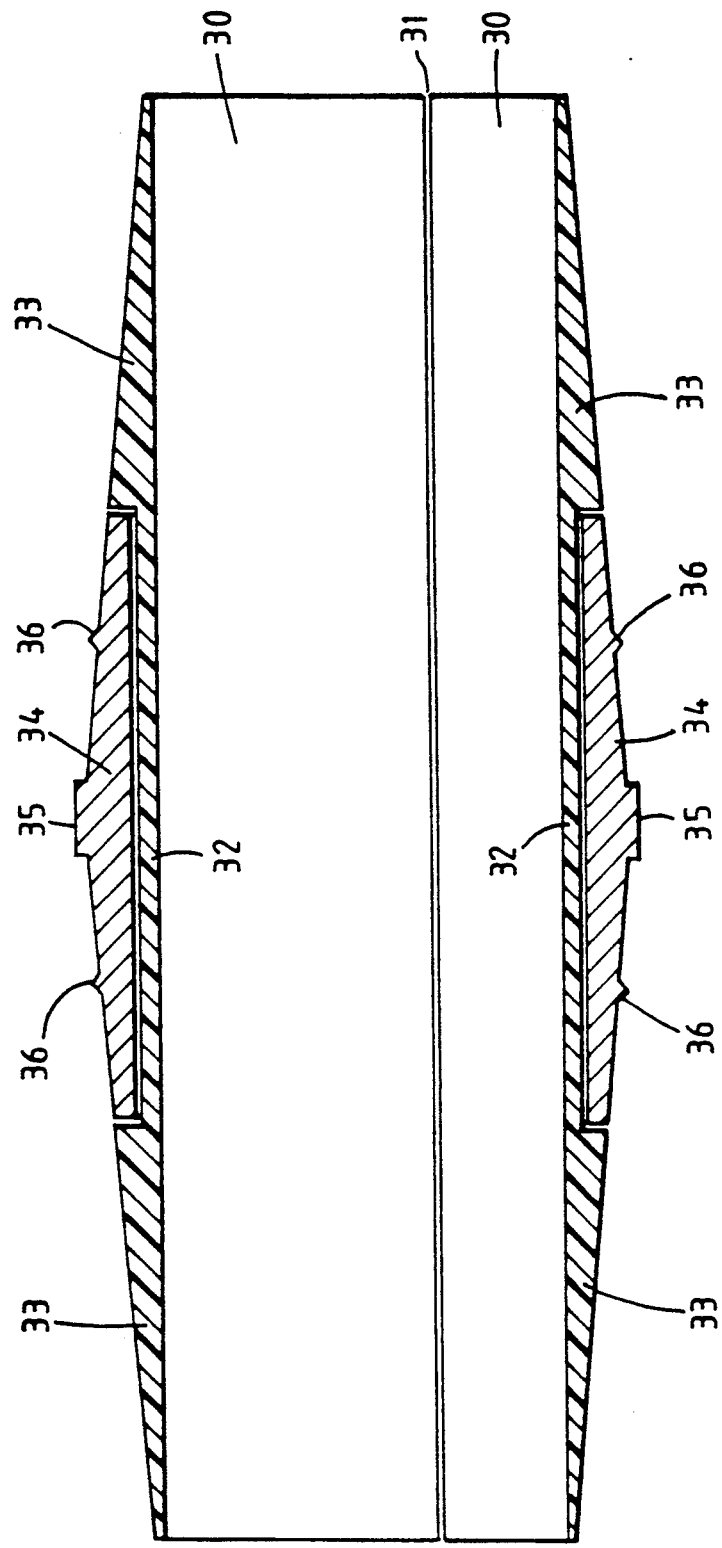
FIG. 3 depicts a longitudinal section of one of two plastics tube and metal collar assemblies employed in making the metal layer reinstatement.

To commence reinstatement, the two protruding ends of the tape 17 need to be flared out, and two composite plastics tube and metal table assemblies, each comprising a plastic tube and metal collar assemblies, each as depicted in longitudinal section in FIG. 3, need to be introduced around the exposed dielectric layer 16.

Referring particularly to FIG. 3, a plastics tube 30, preferably made of natural medium density polyethylene so as to have properties matching those of the dielectric layer it is to surround, is provided with a longitudinally extending slot 31 to enable the tube to be resiliently opened out so that it can be engaged around the exposed dielectric layer 16. The tube 30 has a cylindrical bore lined with a layer (not shown) of adhesive copolymer similar to that with which the metal tape is faced. The bore of the tube, complete with its adhesive lining, is dimensioned to be a snug fit around the exposed dielectric layer. The tube 30 has a waisted region 32, typically about 15 mm long, between two tapered end regions 33, each typically about 10 mm long. In the tapered end regions the included angle between the inner and outer walls of the tube is typically between 2° and 5°.

The waisted region 32 of the tube 30 acts as a housing for a metal collar 34 which is formed in two halves separately identified in FIG. 4 by index numerals 34a and 34b. The bore of the collar 34 is also lined with a layer (not shown) of adhesive copolymer similar to that with which the metal tape is faced. when the collar is fitted in the waisted region 32 of the tube 30, it is a snug fit in that waisted region, and the outer surface of the collar is flush, at the collar ends, with the adjoining outer surface of the tapered end regions 33 of the tube 30. Conveniently, but not necessarily, the outer surface of the collar may continue the tapers as far as a slightly protruding central band 35 protruding to a height substantially matched with the thickness of the metal tape 17. Optionally the contour is interrupted by small projections 36 provided for projection welding.

Once the two tubes 30 and their collars 34 are fitted around the exposed dielectric layer 16, they are moved to the ends of the exposed dielectric and their outward-facing tapers are inserted between the dielectric layer 16 and the protruding regions of metal tape 17. Before this insertion can happen, these protruding regions of metal have to be flared out to provide the requisite space. For this purpose, the two sides of the tape in the region of overlap are separated by the insertion of a knife blade (not shown) or the like, and then a curved knife (not shown) with a contour somewhat similar to that of the cutting edge of a gouge is inserted between the separated two sides, and is worked round to separate the tape from the underlying dielectric layer 16 and to flare the tape with an angle substantially matched with that of the plastics tube and metal collar assembly.

FIG. 4 shows a tube and collar assembly in position with one of its ends inserted under the flared metal tape 17. The length of the protruding tape is chosen so that, when the end of the tape 17 is abutting the central band 35 on the collar 34, the tube 30 terminates a short distance, typically up to 2 cm, short of the end of the jacket 19. While in this position, the tape 17 is welded to the collar 34 using the projection 36 for projection welding if such a projection is provided, but using spot welding if no such projection exists. Preferably the welding is performed in a region where the protruding tape 17 has been flared out to the extent that its two sides are no longer overlapped. On the other hand it is also preferred to ensure that the flaring is small enough to leave the tape sides in an overlapped state over the full length of the plastics tapered end region 33 that has been inserted under the tape.

When both tube and collar assemblies have been located in position with their ends inserted under the two flared protruding portions of the metal tape 17, a fresh piece of the tape (shown in broken outline at 40 in FIG. 4) is cut to length to fit between the nearer side edges of the bands 35 of the two collars 34, and is formed around the exposed dielectric layer 16 using suitable forming tooling (not shown), and its ends are welded to the two collars 34 in the same way that the protruding portions of metal tape 17 were welded to their respective collars. This completes the reinstatement of the metal layer. By ensuring that the original metal tape 17 and the reinstatement tape 40 are fully overlapped, except in regions covering the collars 34, it is ensured that there is no lateral access to the dielectric layer 16, after reinstatement, that does not involve penetration of the metal of either the original metal tape 17, or the reinstatement tape 40, or the collars 34.

The metal tape 17, and the reinstatement metal tape 40, are both curved in one plane only, that is to say they are wrapped into cylindrical form. It is to be clearly understood however that the invention can also be used with cable constructions employing corrugated tape. Corrugated tape of this sort is sometimes used in preference to the other, in order to impart less resistance to bending of the cable, or greater crush resistance (or both). Typically when corrugated tape is employed in the original cable construction, and for the reinstatement tape, the corrugations are flattened out in the immediate vicinity of the tube 30 and collar 34 assemblies.

Figure 5:
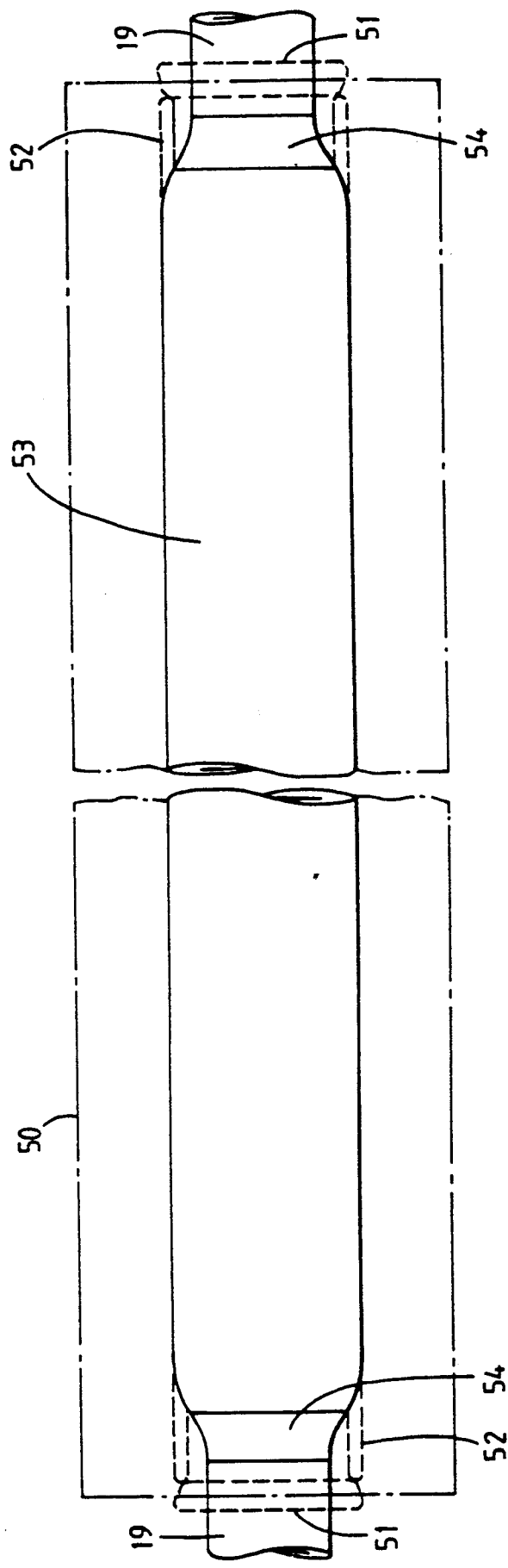
FIG. 5 depicts the cable on completion of the reinstatement.

For the reinstatement of the jacketing to cover the reinstated metal layer, a length 50 (FIG. 5) of heat-shrink tubing internally lined with a layer of melt-flowable plastics material is introduced over one end of the cable. The heat-shrink tubing may be constituted by a helical double wrap of cross-linked polyethylene, and its melt-flowable lining by a layer of very low density polyethylene. The length of this tubing 50 is typically 20 to 50 cm longer than the distance separating the ends of the jacket 19 at either end of the length of dielectric layer 16 that was exposed prior to reinstatement of its covering metal layer, and the tubing 50 is located centrally so that these ends of the jacket 19 lie an equivalent depth inside the ends of the tubing 50. Tubing which is suitable for this purpose is for example provided by the SHRINKWELD tubing marketed by Fujikura under the designation 45-11-1200. Once the tubing 50 is in position it is locally heated in a region extending round its full circumference near the midpoint in its length. This local heating causes the heat-shrink tubing locally to collapse around the underlying cable, and this collapse is propagated first to one end, and then to the other, by axial movement of the localised heating. By this means the resulting flow of its lining material eliminates substantially all voids. A slight extrusion of the melt-flowable lining material is produced from each end of the heat-shrink tubing, this being represented in FIG. 5 by the broken lines 51. These extrusions, together with the extreme ends 52 of the now heat-shrunk tubing are trimmed off to provide a smooth contour for the transition between the material of the jacket 19 and the material of the now heat-shrunk tubing 53 (typically about 22 mm diameter) via an intermediate band 54 of the melt-flowable lining material.

I claim:

1. A method of cable reinstatement including the provision of a reinstatement metal layer to join two longitudinally spaced regions of the cable where the cable has a plastics electrically insulating layer covered by a metal tape layer, said spaced regions being separated by an intervening region from which the metal tape layer has previously been removed, in which method the metal tape layer in said spaced regions is flared, two longitudinally spaced tubes are assembled around the electrically insulating layer in the intervening region, one end of each tube is introduced under an associated one of the flared regions of metal tape and is welded to it, and a reinstatement length of metal tape is engaged around the electrically insulating layer in the intervening region and its ends welded to the two tubes.

2. A method of cable reinstatement in respect of a cable having a plastic electrically insulating layer covered by a metal tape layer having inner end outer surfaces which is encased by a plastics jacket layer, which cable has an exposed intact region of its electrically insulating layer having inner and outer surfaces extending between two positions where an original portion of the metal tape layer protrudes a distance from an original portion of the plastics jacket layer, which method of cable reinstatement comprises providing a reinstatement metal layer to surround the exposed intact region of the electrically insulating layer and to extend between said protruding original portions of the metal tape layer, in which method each of said protruding portions of the metal tape layer is flared to permit the insertion, between its inner surface and the outer surface of the electrically insulating layer, of an end of an associated one of two tubes, made of plastics material, previously introduced around the exposed intact region of the electrically insulating layer, each of which tubes has a substantially cylindrical bore and is provided with a metal collar between tapered ends, the collars of the two tubes being longitudinally spaced apart so as to leave an intervening region between them, wherein, subsequent to said insertion, the flared protruding portions of the metal tape layer are welded to the metal collars of their associated plastics tubes, and a length of metal tape previously formed around the intervening region between the collars of the two plastics tubes is also welded to the collars.

3. A method as claimed in claim 2, wherein the provision of the reinstatement metal layer is succeeded by the provision of a reinstatement plastics jacket to cover the reinstatement metal layer together with said protruding original portions of the metal tape layer, which reinstatement plastics jacket is produced by cross-head extrusion.

4. A method as claimed in claim 2, wherein the provision of the reinstatement metal layer is succeeded by the provision of a reinstatement plastics jacket to cover the reinstatement metal layer, in which a length of heat-shrink tubing internally lined with a layer of melt-flowable plastics material is introduced over one end of the cable, is located with its ends covering the ends of said original portions of the plastics jacket layer, and is heated to produce a flow of its lining material while the tubing is heat-shrunk on to the cable.

5. A method as claimed in claim 4, wherein said heating is performed in a localised region commencing at an intermediate point along the length of the heat-shrunk tubing, progressing first to one end of the tubing and then progressing from the point of commencement to the other end of the tubing.

6. A method as claimed in claim 2, wherein the plastics material of the tubes is also the material of the electrically insulating layer.

7. A method as claimed in claim 6, wherein the provision of the reinstatement metal layer is succeeded by the provision of a reinstatement plastics jacket to cover the reinstatement metal layer together with said protruding original portions of the metal tape layer, which reinstatement plastics jacket is produced by cross-head extrusion.

8. A method as claimed in claim 6, wherein the provision of the reinstatement metal layer is succeeded by the provision of a reinstatement plastics jacket to cover the reinstatement metal layer, in which a length of heat-shrink tubing internally lined with a layer of melt-flowable plastics material is introduced over one end of the cable, is located with its ends covering the ends of said original portions of the plastics jacket layer, and is heated to produce a flow of its lining material while the tuving is shrunk on to the cable.

9. A method as claimed in claim 8, wherein said heating is performed in a localised region commencing at an intermediate point along the length of the heat-shrunk tubing, progressing first to one end of the tubing and then progressing from the point of commencement to the other end of the tubing.

10. A method as claimed in claim 6, wherein between each of the plastics tubes and the electrically insulating layer is included a layer of polymer adhesive.

11. A method as claimed in claim 10, wherein the provision of the reinstatement metal layer is succeeded by the provision of a reinstatement plastics jacket to cover the reinstatement metal layer together with said protruding original portions of the metal tape layer, which reinstatement plastics jacket is produced by cross-head extrusion.

12. A method as claimed in claim 10, wherein the provision of the reinstatement metal layer is succeeded by the provision of a reinstatement plastics jacket to cover the reinstatement metal layer, in which a length of heat-shrink tubing internally lined with a layer of melt-flowable plastics material is introduced over one end of the cable, is located with its ends covering the ends of said original portions of the plastics jacket layer, and is heated to produce a flow of its lining material while the tubing is shrunk on to the cable.

13. A method as claimed in claim 12, wherein said heating is performed in a localised region commencing at an intermediate point along the length of the heat-shrunk tubing, progressing first to one end of the tubing and then progressing from the point of commencement to the other end of the tubing.

14. A method as claimed in claim 10, wherein between each of the plastics tubes and its associated metal collar is included a layer of polymer adhesive.

15. A method as claimed in claim 14, wherein the provision of the reinstatement metal layer is succeeded by the provision of a reinstatement plastics jacket to cover the reinstatement metal layer together with said protruding original portions of the metal tape layer, which reinstatement plastics jacket is produced by cross-head extrusion.

16. A method as claimed in claim 14, wherein the provision of the reinstatement metal layer is succeeded by the provision of a reinstatement plastics jacket to cover the reinstatement metal layer, in which a length of heat-shrink tubing internally lined with a layer of melt-flowable plastics material is introduced over one end of the cable, is located with its ends covering the ends of said original portions of the plastics jacket layer, and is heated to produce a flow of its lining material while the tubing is shrunk on to the cable.

17. A method as claimed in claim 16, wherein said heating is performed in a localised region commencing at an intermediate point along the length of the heat-shrunk tubing, progressing first to one end of the tubing and then progressing from the point of commencement to the other end of the tubing.

* * * * *